United States Patent
Barker

(10) Patent No.: US 10,268,316 B2
(45) Date of Patent: Apr. 23, 2019

(54) TOUCH SCREEN

(71) Applicant: Hewlett-Packard Development Company, L.P., Houston, TX (US)

(72) Inventor: John Barker, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/523,348

(22) PCT Filed: Nov. 24, 2014

(86) PCT No.: PCT/US2014/067118
§ 371 (c)(1),
(2) Date: Apr. 28, 2017

(87) PCT Pub. No.: WO2016/085450
PCT Pub. Date: Jun. 2, 2016

(65) Prior Publication Data
US 2017/0235428 A1    Aug. 17, 2017

(51) Int. Cl.
*G06F 3/041* (2006.01)
*G06F 3/042* (2006.01)

(52) U.S. Cl.
CPC .......... *G06F 3/0421* (2013.01); *G06F 3/0416* (2013.01)

(58) Field of Classification Search
CPC ............................ G06F 3/0421; G06F 3/0416
See application file for complete search history.

(56) References Cited

U.S. PATENT DOCUMENTS

| | | | |
|---|---|---|---|
| 8,294,079 B2 | 10/2012 | Tanaka et al. | |
| 8,339,379 B2 | 12/2012 | Goertz et al. | |
| 9,671,903 B1* | 6/2017 | Piovanelli | G06F 3/042 |
| 2009/0189878 A1 | 7/2009 | Goertz et al. | |
| 2009/0256810 A1 | 10/2009 | Pasquariello | |
| 2010/0020040 A1 | 1/2010 | Han | |
| 2010/0321356 A1 | 12/2010 | Brown et al. | |
| 2013/0100083 A1 | 4/2013 | Sugiyama | |
| 2013/0135259 A1 | 5/2013 | King et al. | |
| 2014/0111444 A1 | 4/2014 | Lindfors et al. | |

OTHER PUBLICATIONS

Chopra, Danish. A Simple Multipurpose Multi Touch Screen. Aug. 24, 2010.

* cited by examiner

*Primary Examiner* — Abhishek Sarma
(74) *Attorney, Agent, or Firm* — H Inc. Patent Department

(57) ABSTRACT

Examples of a touch screen are disclosed herein. One example of the touch screen includes a plurality of light emitting diodes positioned adjacent a perimeter of a panel and a circuit electrically connected to the plurality of light emitting diodes to individually and sequentially illuminate the light emitting diodes. This example of the touch screen additionally includes a plurality of photodiodes positioned adjacent the perimeter of the panel so that each photodiode receives light from at least one of the light emitting diodes when illuminated by the circuit. Photodiodes that receive light from different light emitting diodes are electrically connected in parallel.

17 Claims, 6 Drawing Sheets

TOUCH SCREEN

BACKGROUND

End users appreciate performance and features in their electronic devices. They also appreciate case of use and cost effective solutions for their electronic device needs. Designers and manufactures may, therefore, endeavor to create and provide electronic devices directed toward at least some of these objectives.

BRIEF DESCRIPTION OF THE DRAWINGS

The following detailed description references the drawings, wherein.

DETAILED DESCRIPTION

Figure 1:
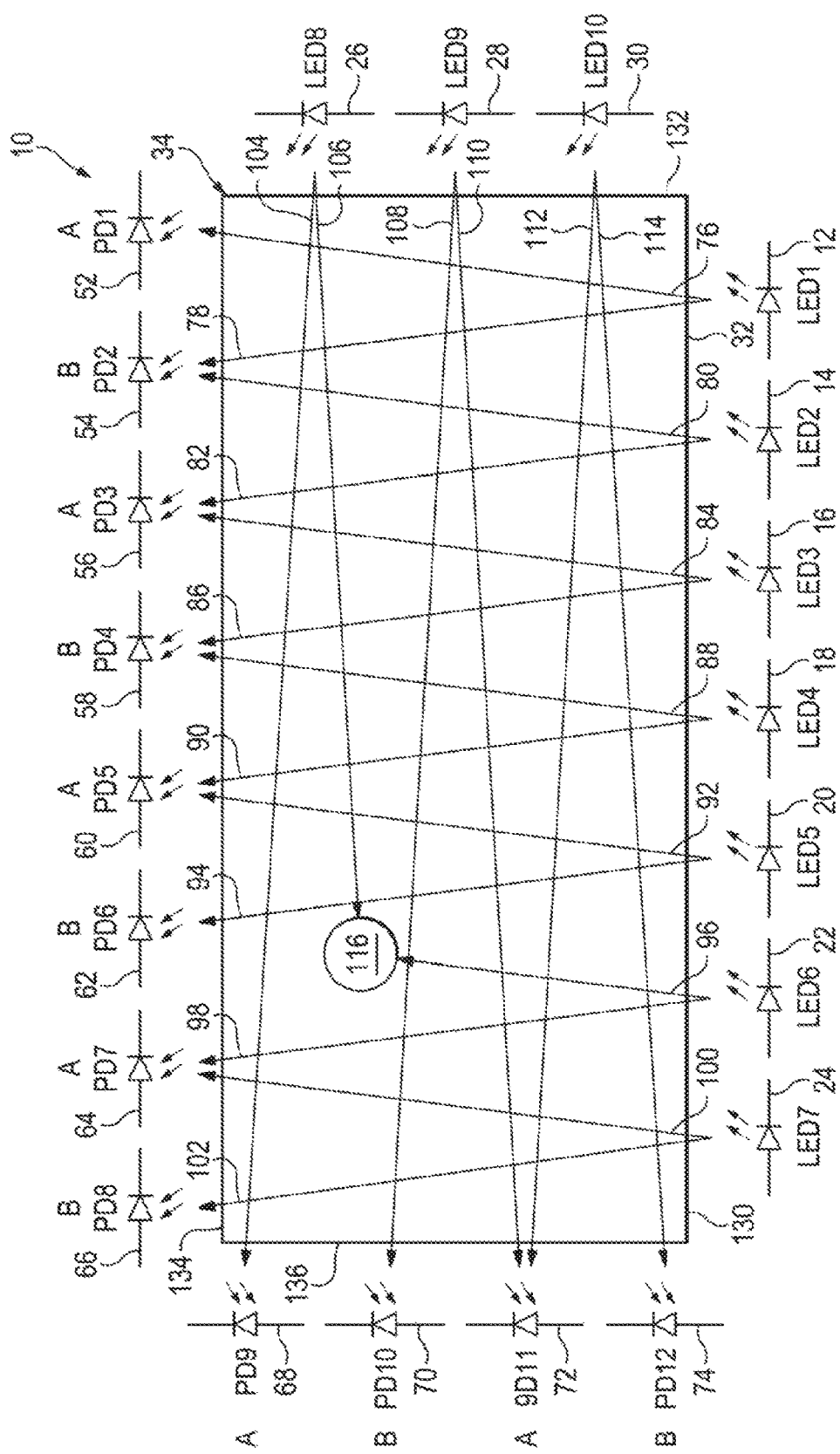
FIG. 1 is a diagram of an example of a portion of a touch screen.

An electronic device may include a touch screen to allow users of the electronic device to enter data and/or commands to the electronic device. The touch screen may also display information relating to the operation and status of the electronic device.

A touch screen may utilize light emitting diodes (LEDs) and photodiodes to determine the location of a touch on a panel of the touch screen. The LEDs are illuminated and the light emitted by these LEDs is received by the photodiodes. The photodiodes convert this received light into electrical signals that are proportional to the amount of light received.

The light emitted by the LEDs may be above the panel of the touch screen so that a touch blocks some of the light being received by some of the photodiodes. The change in electrical signal levels produced by these photodiodes may then be used to determine the location of the light obstruction caused by the touch. Other touch screens may use a Frustrated Total Internal Reflection (FTIR) approach where a touch on the panel of the touch screen causes the light emitted by the LEDs to be reduced and/or redirected.

The LEDs and photodiodes of a touch screen are electrically connected to a circuit such as, for example, an Analog Front End (AFE). The circuit controls illumination of the LEDs and processing of electrical signals received from the photodiodes to help in the determination of the location of the touch on the panel of the touch screen. Each of the LED and photodiode connections to the circuit may increase the size and cost of the circuit.

Examples directed in addressing the technical challenges associated with reducing the number of LED and/or photodiode connections to this circuit are shown in FIGS. 1-6. These examples help to reduce the number of LED and/or photodiode connections to the circuit which may save cost. The size of the circuit may also be reduced because of these fewer connections which may reduce the material cost associated with the manufacture of the circuit.

As used herein, the "electronic device" represents, but is not necessarily limited to, a printing device, tablet, phone, personal digital assistant, imaging device, wearable device, portable computer, desktop computer, display, monitor, or combination thereof. As used herein, the terms "include", "includes", "including", "have", "has", "having" and variations thereof, mean the same as the terms "comprise", "comprises", and "comprising" or appropriate variations thereof.

As used herein, the term "circuit" represents, but is not necessarily limited to, an interconnection of elements such as, for example, a resistor, inductor, capacitor, voltage source, current source, transistor, application specific integrated circuit (ASIC), Analog Front End (AFE), gate array, processor, controller, switch, transformer, timer, relay, multiplexor, connector, comparator, amplifier, filter, and/or module having these elements that allow operations to be performed alone or in combination with other elements or components. As used herein, the term "light emitting diode (LED)" represents, but is not necessarily limited to, a semiconductor device that emits light when activated. The light may be of any predetermined or desired wavelength (e.g., infrared). As used herein, the term "photodiode" represents, but is not necessarily limited to, a semiconductor device that converts light into an electrical signal. The amplitude of this electrical signal may be proportional to the amount of light received by the photodiode.

Figure 2:
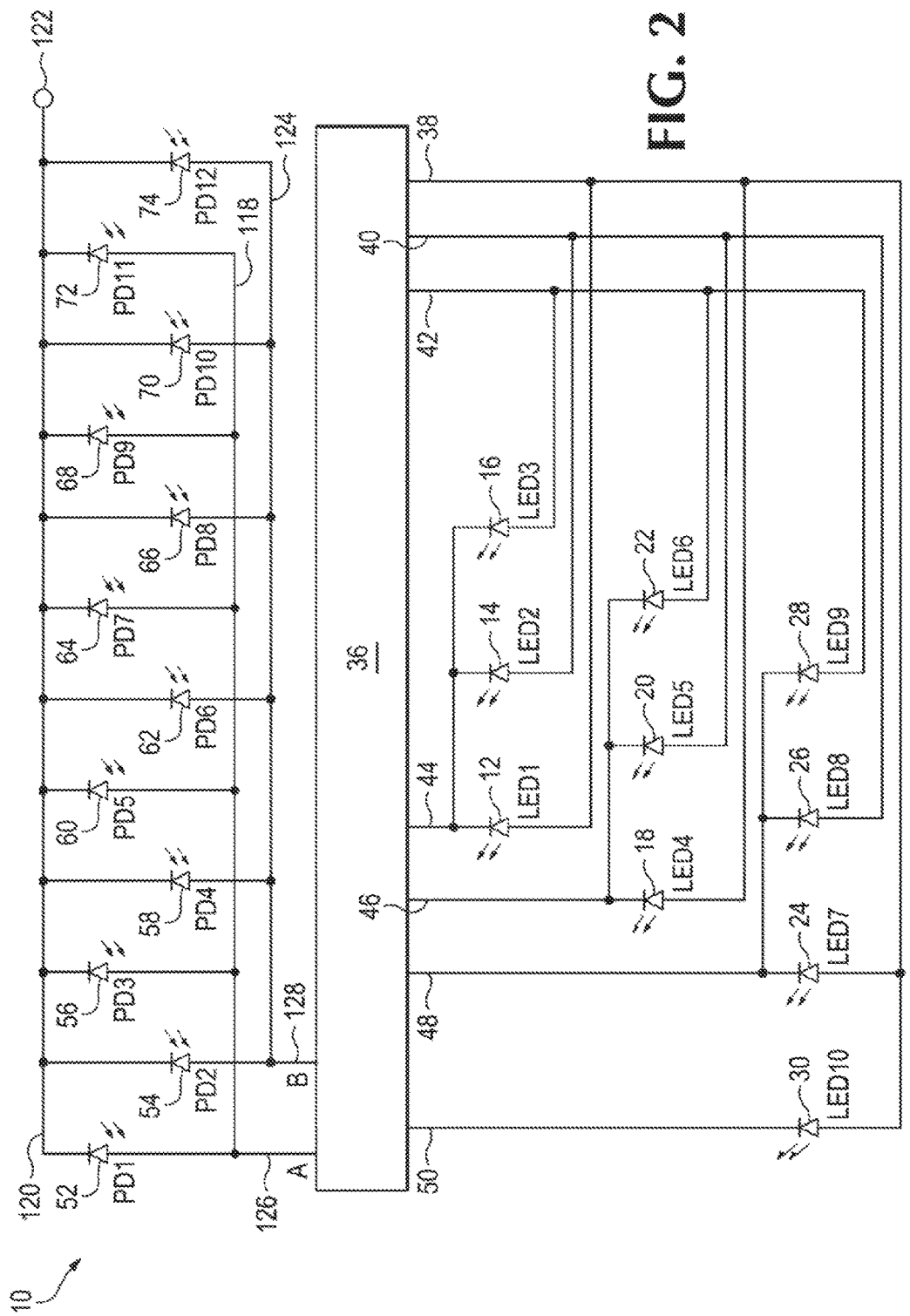
FIG. 2 is a diagram of an example of the remaining portion of the touch screen of FIG. 1.

A diagram of an example of a portion of a touch screen 10 is shown in FIG. 1. As can be seen in FIG. 1, touch screen 10 includes a plurality of light emitting diodes (LEDs) 12, 14, 16, 18, 20, 22, 24, 26, 28, and 30 positioned adjacent a perimeter 32 of a panel 34. A diagram of an example of the remaining portion of touch screen 10 is shown in FIG. 2. As can be seen in FIG. 2, touch screen 10 also includes a circuit 36 electrically connected to the plurality of LEDs 12, 14, 16, 18, 20, 22, 24, 26, 28, and 30 via lines 38, 40, 42, 44, 46, 48, and 50, as shown, to individually and sequentially illuminate LEDs 12, 14, 16, 18, 20, 22, 24, 26, 28, and 30.

For example, lines 38 and 44 are activated by circuit 36 to apply a forward bias to LED 12 to illuminate LED 12. Next, lines 40 and 44 are activated by circuit 36 to apply a forward bias to LED 14 to illuminate LED 14. Lines 42 and 44 are then activated by circuit 36 to apply a forward bias to LED 16 to illuminate LED 16. Next, lines 38 and 46 are activated by circuit 36 to apply a forward bias to LED 18 to illuminate LED 18. Lines 40 and 46 are then activated by circuit 36 to apply a forward bias to LED 20 to illuminate LED 20. Next, lines 42 and 46 are activated by circuit 36 to apply a forward bias to LED 22 to illuminate LED 22. Lines 38 and 48 are then activated by circuit 36 to apply a forward bias to LED 24 to illuminate LED 24. Next, lines 40 and 48 are activated by circuit 36 to apply a forward bias to LED 26 to illuminate LED 26. Then, lines 42 and 48 are activated by circuit 36 to apply a forward bias to LED 28 to illuminate LED 28. Finally, lines 38 and 50 are activated by circuit 36 to apply a forward bias to LED 30 to illuminate LED 30.

Referring again to FIG. 1, touch screen 10 additionally includes a plurality of photodiodes 52, 54, 56, 58, 60, 62, 64, 66, 68, 70, 72, and 74 positioned adjacent perimeter 32 of panel 34 so that each photodiode 52, 54, 56, 58, 60, 62, 64, 66, 68, 70, 72, and 74 receives light from at least one of LEDs 12, 14, 16, 18, 20, 22, 24, 26, 28, and 30 when illuminated by circuit 36 (see FIG. 2). As can be seen in FIG. 1, in this example, photodiode 52 receives light from LED 12, as indicated by arrow 76, photodiode 54 receives light from LEDs 12 and 14, as indicated by respective arrows 78 and 80, photodiode 56 receives light from LEDs 14 and 16, as indicated by respective arrows 82 and 84, photodiode 58 receives light from LEDs 16 and 18, as indicated by respective arrows 86 and 88, photodiode 60 receives light from LEDs 18 and 20, as indicated by respective arrows 90 and 92, photodiode 62 receives light from LEDs 20 and 22, as indicated by respective arrows 94 and 96, photodiode 64 receives light from LEDs 22 and 24, as indicated by respective arrows 98 and 100, photodiode 66 receives light from LED 24, as indicated by arrow 102, photodiode 68 receives light from LED 26, as indicated by arrow 104, photodiode 70 receives light from LEDs 26 and 28, as indicated by respective arrows 106 and 108, photodiode 72 receives light from LEDs 28 and 30, as indicated by respective arrows 110 and 112, and photodiode 74 receives light from LED 30, as indicated by arrow 114.

As can also be seen in FIG. 1, touch 116 blocks some or all of light 96 from reaching photodiode 62 and some or all of light 106 from reaching photodiode 70 which results in a change in electrical signal levels produced photodiodes 62 and 70. These changes in electrical signal levels are proportional to the amount of light received by photodiodes 62 and 70, and may then be used to determine the location of the light obstruction on panel 34 caused by the touch 116.

As can be seen in FIG. 2, photodiodes 52, 54, 56, 58, 60, 62, 64, 66, 68, 70, 72, and 74 that receive light from different LEDs 12, 14, 16, 18, 20, 22, 24, 26, 28, and 30 when illuminated by circuit 36 are electrically connected in parallel. More specifically, photodiodes 52, 56, 60, 64, 68, and 72 are electrically connected in parallel via line 118 and line 120 to voltage reference 122 and photodiodes 54, 58, 62, 66, 70 and 74 are electrically connected in parallel via line 124 and line 130 to voltage reference 122.

As can also be seen in FIG. 2, photodiodes 52, 56, 60, 64, 68, and 72 are electrically connected to circuit 36 via line 126 and photodiodes 54, 58, 62, 66, 70 and 74 are electrically connected to circuit 36 via line 128 to transmit electrical signals to circuit 36 proportional to the amount of light received by photodiodes 52, 54, 56, 58, 60, 62, 64, 66, 68, 70, 72 and 74 from LEDs 12, 14, 16, 18, 20, 22, 24, 26, 28, and 30. This arrangement results in two connections to circuit 36 via lines 126 and 128 for all of photodiodes 52, 54, 56, 58, 60, 62, 64, 66, 68, 70, 72, and 74 rather than twelve separate connections to circuit 36 for all of photodiodes 52, 54, 56, 58, 60, 62, 64, 66, 68, 70, 72, and 74. This helps cost by both reducing the number of connections to circuit 36 for photodiodes 52, 54, 56, 58, 60, 62, 64, 66, 68, 70, 72, and 74, as well as reducing the overall size of circuit 36 which saves material cost associated with the manufacture of circuit 36. This electrical configuration of photodiodes 52, 54, 56, 58, 60, 62, 64, 66, 68, 70, 72, and 74, circuit 36, and voltage reference 122 also helps to determine the location of touch 116 on panel 34 of touch screen 10.

As can be seen in FIG. 1, in this example of touch screen 10, photodiodes 52, 54, 56, 58, 60, 62, 64, 66, 68, 70, 72, and 74 are positioned adjacent perimeter 32 of panel 34 opposite LEDs 12, 14, 16, 18, 20, 22, 24, 26, 28, and 30. It is to be understood, however, that in other examples of touch screen 10, photodiodes 52, 54, 56, 58, 60, 62, 64, 66, 68, 70, 72, and 74 do not have to be positioned adjacent perimeter 32 of panel 34 opposite LED 12, 14, 16, 18, 20, 22, 24, 26, 28, and 30. As can also be seen in FIG. 1, the number of LEDs 12, 14, 16, 18, 20, 22, 24, 26, 78, and 30 (in this case ten) is less than the number of photodiodes 52, 54, 56, 58, 60, 62, 64, 66, 68, 70, 72, and 74 (in this case twelve). It is to be understood, however, that in other examples of touch screen 10, the number of LEDS may be greater than or equal to the number of photodiodes. It is also to be understood, however, that in other examples of touch screen 10, the total number of LEDs may be greater than or less than ten and the number of photodiodes may be greater than or less than twelve.

As can additionally be seen in FIG. 1, LEDs 12, 14, 16, 18, 20, 22, and 24 form a first set of LEDs that are positioned along a first length 130 of panel 34 and LEDs 26, 28, and 30 form a second set of LEDs that are positioned along a first width 132 of panel 34. As can further be seen in FIG. 1, pbotodiodes 52, 54, 56, 58, 60, 62, 64, and 66 form a first set of photodiodes that are positioned along a second length 134 of panel 34 opposite first set of LEDs 12, 14, 16, 18, 20, 22, and 24 and photodiodes 68, 70, 72, and 74 form a second set of photodiodes that are positioned along a second width 136 of panel 34 opposite second set of LEDs 26, 28, and 30. This arrangement of LEDS 12, 14, 16, 18, 20, 22, 24, 26, 28, and 30 and photodiodes 52, 54, 56, 58, 60, 62, 64, 66, 68, 70, 72, and 74 results from the rectangular shape of panel 34 of touch screen 10. It is to be understood, however, that in other examples of touch screen 10, panel 34 may have a different shape (e.g., circular).

Figure 3:
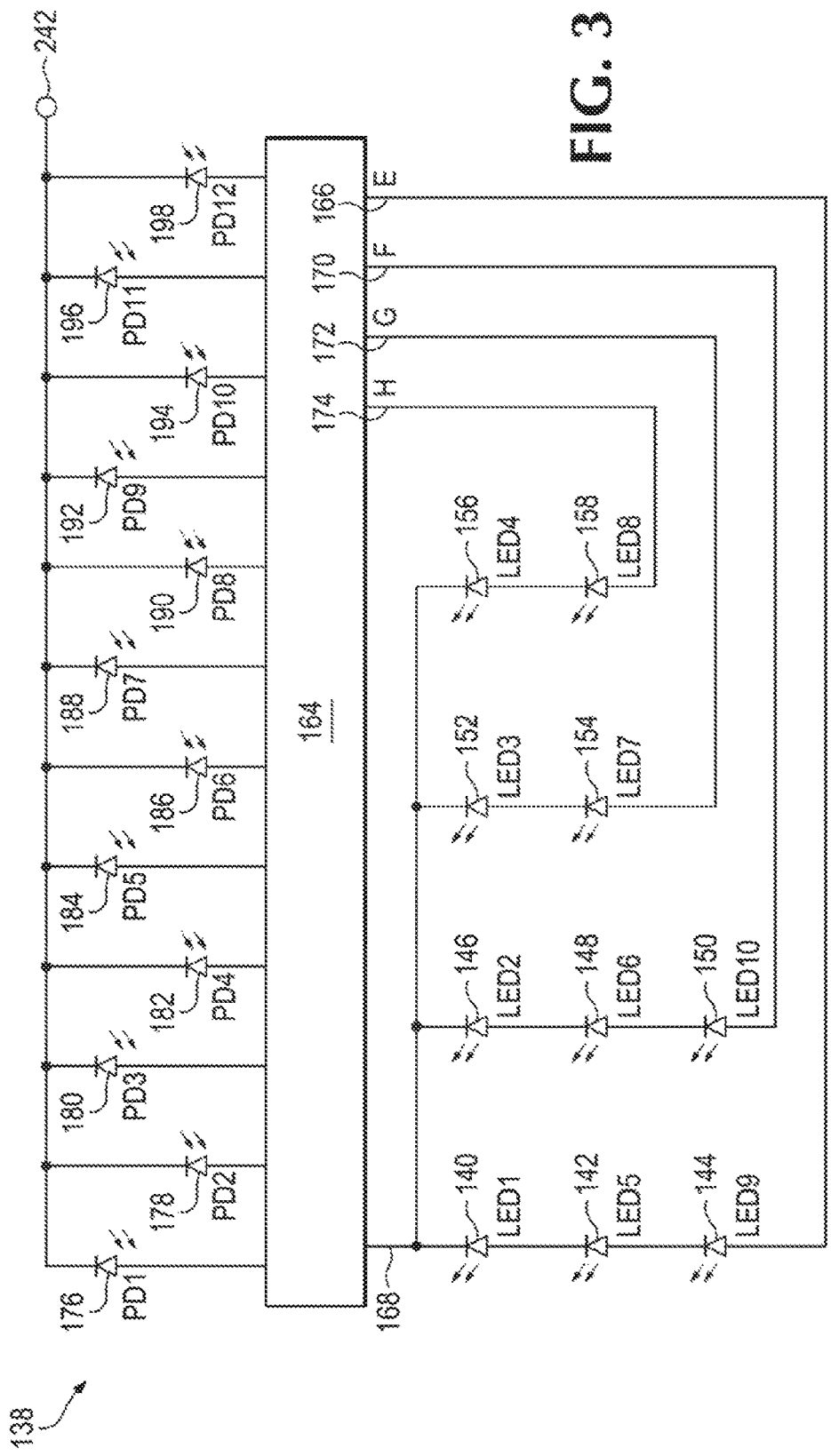
FIG. 3 is a diagram of another example of a portion of a touch screen.
Figure 4:
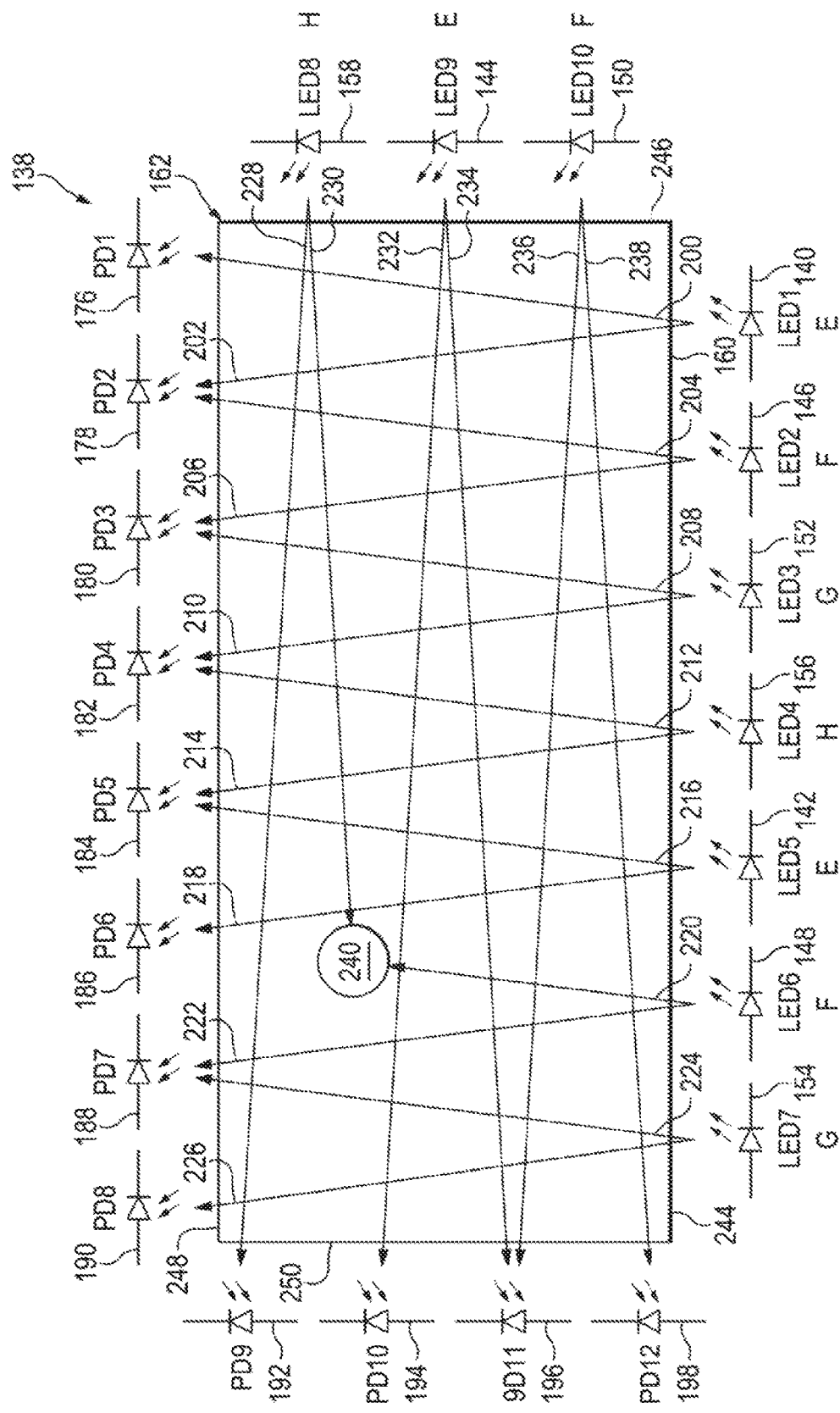
FIG. 4 is a diagram of an example of the remaining portion of the touch screen of FIG. 3.

A diagram of an example of a portion of a touch screen 138 is shown in FIG. 3. As can be seen in FIG. 3, touch screen 138 includes a first plurality of light emitting diodes (LEDs) 140, 142, and 144 electrically connected in series, a second plurality of LEDs 146, 148, and 150 electrically connected in series, a third plurality of LEDs 152 and 154 electrically connected in series, and a fourth plurality of LEDs 156 and 158 electrically connected in series. As can be seen in FIG. 4, each of LEDS 140, 142, 144, 146, 148, 150, 152, 154, 156, and 158 is positioned adjacent a perimeter 160 of a panel 162 of touch screen 138.

As can be seen in FIG. 3, touch screen 138 also includes a circuit 164 electrically connected to first plurality of LEDs 140, 142, and 144 via lines 166 and 168, second plurality of LEDs 146, 148, 150 via lines 170 and 168, third plurality of LEDs 152 and 154 via lines 172 and 168, and fourth plurality of LEDs 156 and 158 via lines 174 and 168. Circuit 164 is designed to illuminate first plurality of LEDs 140, 142, and 144 by applying a forward bias to LEDs 140, 142, and 144 via lines 166 and 168, then second plurality of LEDs 146, 148, and 150 by applying a forward bias to LEDs 146, 148, and 150 via lines 170 and 168, then third plurality of LEDs 152 and 154 by applying a forward bias to LEDs 152 and 154 via lines 172 and 168, and finally fourth plurality of LEDs 156 and 158 by applying a forward bias to LEDs 156 and 158 via lines 174 and 168.

Although four different pluralities of series connected LEDs are shown in FIGS. 3 and 4, it is to be understood that in other examples of touch panel 138, a fewer number of pluralities of series connected LEDs (e.g., a first plurality of LEDs electrically connected in series and a second plurality of LEDs electrically connected in series) or a greater number of pluralities of series connected LEDs may be utilized. Additionally, in other examples of touch panel 138, a different number of LEDS may be electrically connected in series than as shown for first plurality of LEDs 140, 142, and 144, second plurality of LEDs 146, 148, 150, third plurality of LEDs 152 and 154 and/or fourth plurality of LEDs 156 and 158.

As can be seen in FIG. 4, touch screen 138 additionally includes a plurality of photodiodes 176, 178, 180, 182, 184, 186, 188, 190, 192, 194, 196, and 198 positioned adjacent perimeter 160 of panel 162 so that each photodiode 176, 178, 180, 182, 184, 186, 188, 190, 192, 194, 196, and 198 receives light from at least one of the first plurality of light emitting diodes (LEDs) 140, 142, and 144, the second plurality of LEDs 146, 148, and 150, the third plurality of LEDs 152 and 154, or the fourth plurality of LEDs 156 and 158 when illuminated by circuit 164 (see FIG. 3). As can be seen in FIG. 4, in this example, photodiode 176 receives light from LED 140, as indicated by arrow 200, photodiode 178 receives light from LEDs 140 and 146, as indicated by respective arrows 202 and 204, photodiode 180 receives light from LEDs 146 and 152, as indicated by respective arrows 206 and 208, photodiode 182 receives light from LEDs 152 and 156, as indicated by respective arrows 210 and 212, photodiode 184 receives light from LEDs 156 and 142, as indicated by respective arrows 214 and 216, photodiode 186 receives light from LEDs 142 and 148, as indicated by respective arrows 218 and 220, photodiode 188 receives light from LEDs 148 and 154, as indicated by respective arrows 222 and 224, photodiode 190 receives light from LED 154, as indicated by arrow 226, photodiode 192 receives light from LED 158, as indicated by arrow 228, photodiode 194 receives light from LEDs 158 and 144, as indicated by respective arrows 230 and 232, photodiode 196 receives light from LEDs 144 and 150, as indicated by respective arrows 234 and 236, and photodiode 198 receives light from LED 150, as indicated by arrow 238.

As can also be seen in FIG. 4, touch 240 blocks some or all of light 220 from reaching photodiode 186 and some or all of light 230 from reaching photodiode 194 which results in a change in electrical signal levels produced photodiodes 186 and 194. These changes in electrical signal levels are proportional to the amount of light received by photodiodes 186 and 194, and may then be used to determine the location of the light obstruction on panel 162 caused by touch 240.

As can be seen in FIG. 3, photodiodes 176, 178, 180, 182, 184, 186, 188, 190, 192, 194, 196 and 198 are each separately electrically connected to circuit 164 and voltage reference 242 to transmit electrical signals to circuit 164 that are proportional to the amount of light received by photodiodes 176, 178, 180, 182, 184, 186, 188, 190, 192, 194, 196 and 198 from illuminated LEDs 140, 142, 144, 146, 148, 150, 152, 154, 156, and 158. This electrical configuration of photodiodes 176, 178, 180, 182, 184, 186, 188, 190, 192, 194, 196 and 198, circuit 164, and voltage reference 242 helps to determine the location of touch 240 on panel 162 of touch screen 138.

As can also be seen in FIG. 3, the series connections of LEDs 140, 142, and 144, LEDs 146, 148, and 150, LEDs 152 and 154, and LEDs 156 and 158 results in five separate connections to circuit 164 rather than seven separate connections to circuit 164 for all of LEDs 140, 142, 144, 146, 148, 150, 152, 154, 156, and 158 if LEDs 140, 142, 144, 146, 148, 150, 152, 154, 156, and 158 were in a multiplexed connection to circuit 164, as shown, for example, with respect to LEDs 12, 14, 16, 18, 20, 22, 24, 26, 28, and 30 and circuit 36 of FIG. 2. This helps save cost by both reducing the number connections to circuit 164 for LEDs 140, 142, 144, 146, 148, 150, 152, 154, 156, and 158, as well as reducing the overall size of circuit 164 which saves material cost associated with the manufacture of circuit 164.

As can be seen in FIG. 4, in this example of touch screen 138, photodiodes 176, 178, 180, 182, 184, 186, 188, 190, 192, 194, 196, and 198 are positioned adjacent perimeter 160 of panel 162 opposite LEDs 140, 142, 144, 146, 148, 150, 152, 154, 156, and 158. It is to be understood, however, that in other examples of touch screen 138, photodiodes 176, 178, 180, 182, 184, 186, 188, 190, 192, 194, 196, and 198 do not have to be positioned adjacent perimeter 160 of panel 162 opposite LEDs 140, 142, 144, 146, 148, 150, 152, 154, 156, and 158. As can also be seen in FIG. 4, the number of LEDs 140, 142, 144, 146, 148, 150, 152, 154, 156, and 158 (in this case ten) is less than the number of photodiodes 176, 178, 180, 182, 184, 186, 188, 190, 192, 194, 196, and 198 (in this case twelve). It is to be understood, however, that in other examples of touch screen 138, the number of LEDS may be greater than or equal to the number of photodiodes. It is also to be understood, however, that in other examples of touch screen 138, the total number of LEDs may be greater than or less than ten, and the number of photodiodes may be greater than or less than twelve.

As can additionally be seen in FIG. 4, LEDs 140 and 142 from the first plurality of series connected LEDs 140, 142, and 144, LEDs 146 and 148 from the second plurality of series connected LEDs 146, 148, and 150, LEDs 152 and 154 from the third plurality of series connected LEDs 152 and 154, and LED 156 from the fourth plurality of series connected LEDs 156 and 158 are positioned along a first length 244 of panel 162. Also, LED 144 from the first plurality of series connected LEDs 140, 142, and 144. LED 150 from the second plurality of series connected LEDs 146, 148, and 150, and LED 158 from the fourth plurality of series connected LEDs 156 and 158 are positioned along a first width 246 of panel 162. As can further be seen in FIG. 4, photodiodes 176, 178, 180, 182, 184, 186, 188, and 190 form a first set of photodiodes that are positioned along a second length 248 of panel 162 opposite LEDs 140, 142, 146, 148, 152, 154, and 156 and photodiodes 192, 194, 196, and 198 form a second set of photodiodes that are positioned along a second width 250 of panel 162 opposite LEDs 144, 150, and 158. This arrangement of LEDS 140, 142, 144, 146, 148, 150, 152, 154, 156, and 158 and photodiodes 176, 178, 180, 182, 184, 186, 188, 190, 192, 194, 196, and 198 results from the rectangular shape of panel 162 of touch screen 138. It is to be understood, however, that in other examples of touch screen 138, panel 162 may have a different shape (e.g., circular).

Figure 5:
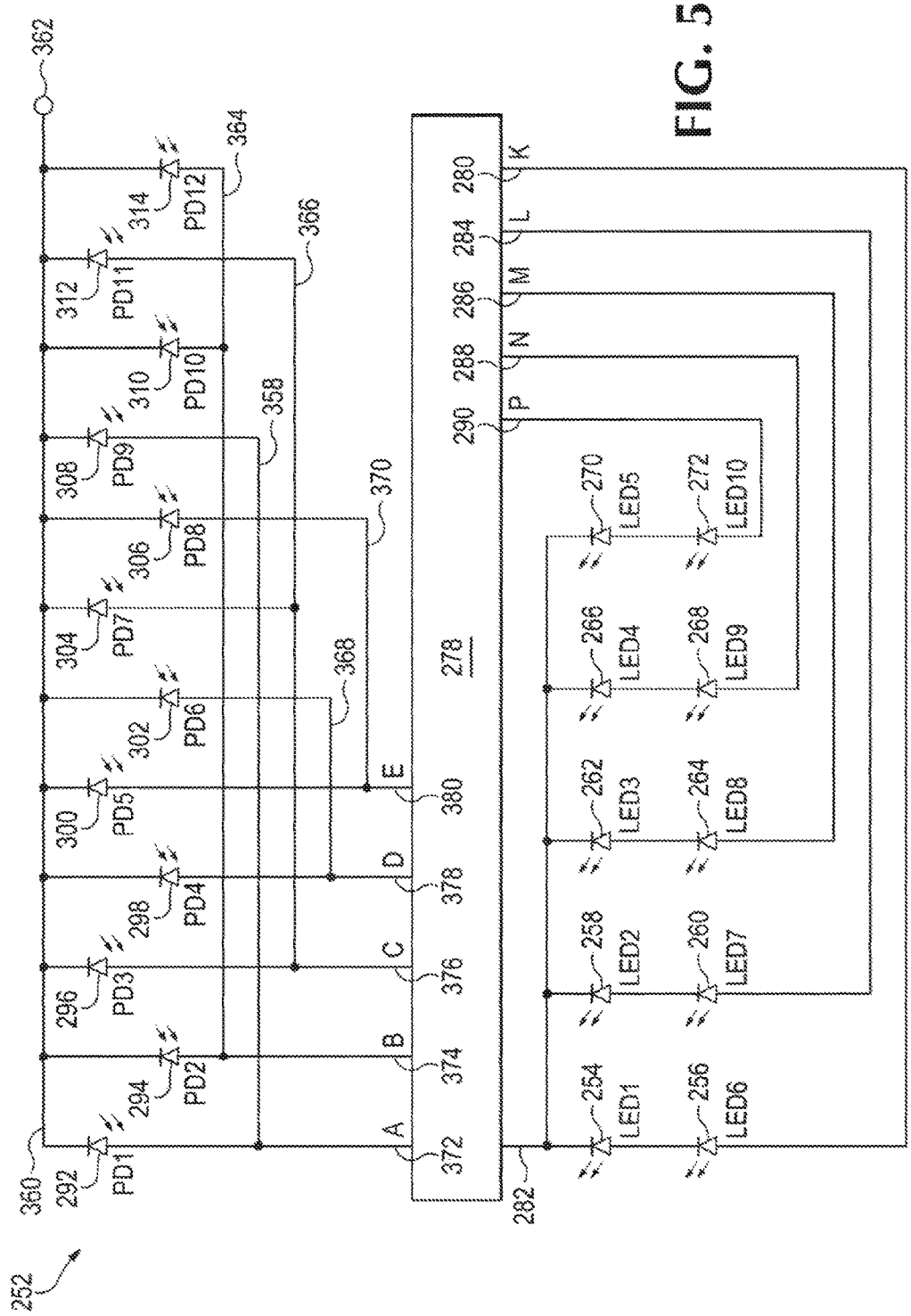
FIG. 5 is a diagram of an additional example of a portion of a touch screen.
Figure 6:
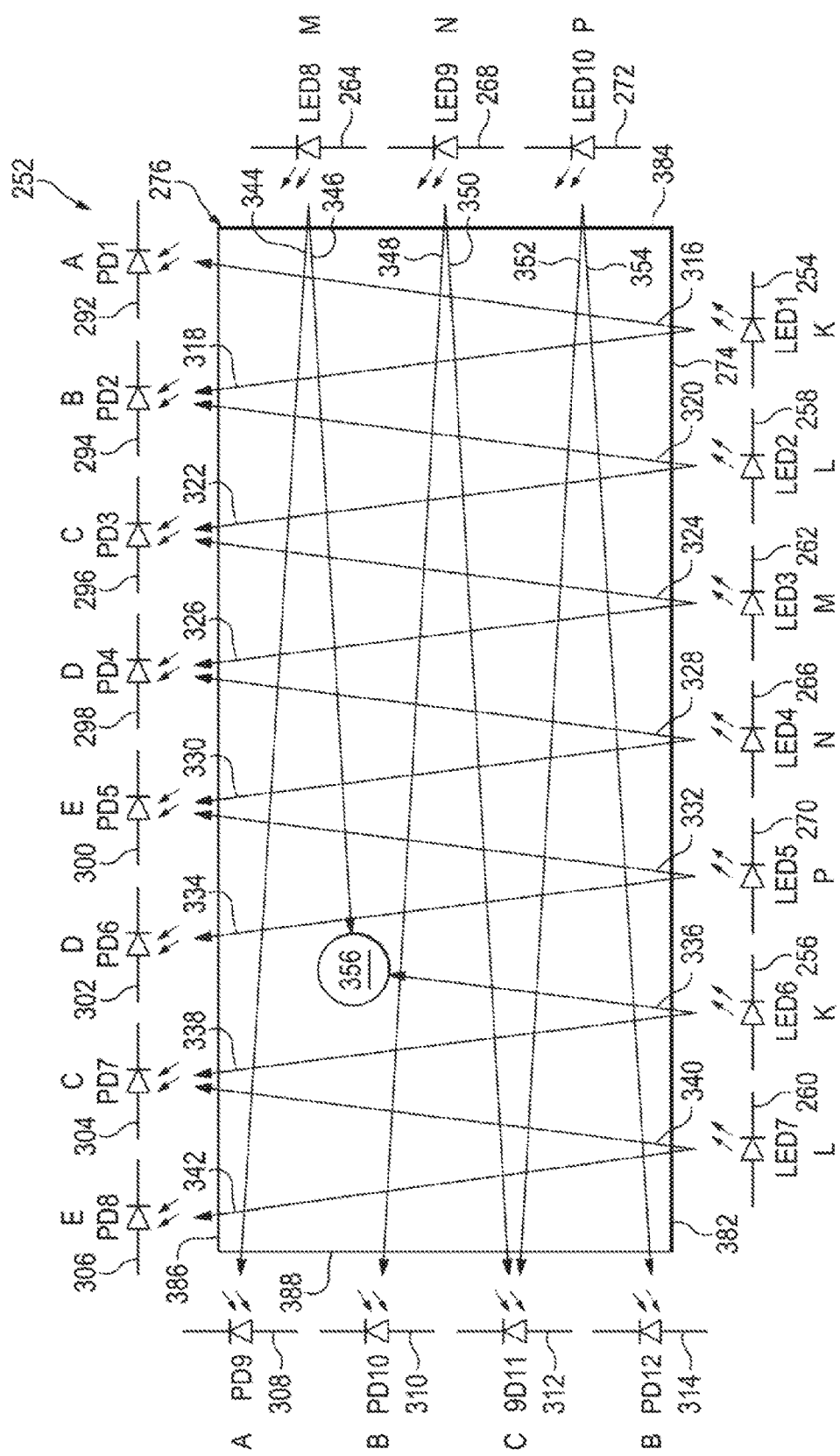
FIG. 6 is a diagram of an example of the remaining portion of the touch screen of FIG. 5.

A diagram of an example of a portion of a touch screen 252 is shown in FIG. 5. As can be seen in FIG. 5, touch screen 252 includes a first plurality of light emitting diodes (LEDs) 254 and 256 electrically connected in series, a second plural LEDs 258 and 260 electrically connected in series, a third plurality of LEDs 262 and 264 electrically connected in series, a fourth plurality of LEDs 266 and 268 electrically connected in series, and a fifth plurality of LEDs 270 and 272 electrically connected in series. As can be seen in FIG. 6, each of LEDs 254, 256, 258, 260, 262, 264, 266, 268, 270, and 272 is positioned adjacent a perimeter 274 of a panel 276 of touch screen 252.

As can be seen in FIG. 5, touch screen 252 also includes a circuit 278 electrically connected to first plurality of LEDs 254 and 256 via lines 280 and 282, second plurality of LEDs 258 and 260 via lines 284 and 282, third plurality of LEDs 262 and 264 via lines 286 and 282, fourth plurality of LEDs 266 and 268 via lines 288 and 282, and fifth plurality of LEDs 270 and 272 via lines 290 and 282. Circuit 278 is designed to illuminate first plurality of LEDs 254 and 256 by applying a forward bias to LEDs 254 and 256 is lines 280 and 282, then second plurality of LEDs 258 and 260 by applying a forward bias to LEDs 258 and 260 via lines 284 and 282, then third plurality of LEDs 262 and 264 by applying a forward bias to LEDs 262 and 264 via lines 286 and 282, then fourth plurality of LEDs 266 and 268 by applying a forward bias to LEDs 266 and 208 via lines 288 and 282, and finally fifth plurality of LEDs 270 and 272 by applying a forward bias to LEDs 270 and 272 via lines 290 and 282.

Although five different pluralities of series connected LEDs are shown in FIGS. 5 and 6, it is to be understood that in other examples of touch panel 252, a fewer number of pluralities of series connected LEDs (e.g., a first plurality of LEDs electrically connected in series and a second plurality of LEDs electrically connected in series) or a greater number of pluralities of series connected LEDs may be utilized. Additionally, in other examples of touch panel 252, a different number of LEDs may be electrically connected in series than as shown for first plurality of LEDs 254 and 256, second plurality of LEDs 258 and 260, third plurality of LEDs 262 and 264, fourth plurality of LEDs 266 and 268 and/or fifth plurality of LEDs 270 and 272.

As can also be seen in FIG. 5, the series connections of LEDs 254 and 256, LEDs 258 and 260, LEDs 262 and 264, LEDs 266 and 248, and LEDs 270 and 272 results in six separate connections to circuit 278 rather than seven separate connections to circuit 278 for all of LEDs 254, 256, 258, 260, 262, 264, 266, 268, 270, and 272 if LEDs 254, 256, 258, 260, 262, 264, 266, 268, 270, and 272 were in a multiplexed connection to circuit 278, as shown, for example, with respect to LEDs 12, 14, 16, 18, 20, 22, 24, 26, 28, and 30 and circuit 36 of FIG. 2. This helps save cost by both reducing the number of connections to circuit 278 for LEDs 254, 256, 258, 260, 262, 264, 266, 268, 270, and 272, as well as reducing the overall size of circuit 278 which saves material cost associated with the manufacture of circuit 278.

As can be seen in FIG. 6, touch screen 252 additionally includes a plurality of photodiodes 292, 294, 296, 298, 300, 302, 304, 306, 308, 310, 312, and 314 positioned adjacent perimeter 274 of panel 276 so that each photodiode 292, 294, 296, 298, 300, 302, 304, 306, 308, 319, 312, and 314 receives light from at least one of the first plurality of light emitting diodes (LEDs) 254 and 256, the second plurality of LEDs 258 and 260, the third plurality of LEDs 262 and 264, the fourth plurality of LEDs 266 and 268, or the fifth plurality of LEDS 270 and 272 when illuminated by circuit 278 (sec FIG. 5). As can be seen in FIG. 6, in this example, photodiode 292 receives light from LED 254, as indicated by arrow 316, photodiode 294 receives light from LEDs 254 and 258, as indicated by respective arrow 318 and 320, photodiode 296 receives light from LEDs 258 and 262, as indicated by respective arrows 322 and 324, photodiode 298 receives light from LEDs 262 and 266, as indicated by respective arrows 326 and 328, photodiode 300 receives light from LEDs 266 and 270, as indicated by respective arrows 330 and 332, photodiode 302 receives light from LEDs 270 and 256, as indicated by respective arrows 334 and 336, photodiode 304 receives light from LEDs 256 and 260, as indicated by respective arrows 338 and 340, photodiode 306 receives light from LED 260, as indicated by arrow 342, photodiode 308 receives light from LED 264, as indicated by arrow 344, photodiode 310 receives light from LEDs 264 and 268, as indicated by respective arrows 346 and 348, photodiode 312 receives light from LEDs 268 and 272, as indicated by respective arrows 350 and 352, and photodiode 314 receives light from LED 272, as indicated by arrow 354.

As can also be seen in FIG. 6, touch 356 blocks some or all of light 336 from reaching photodiode 302 and some or all of light 346 from reaching photodiode 310 which results in a change in electrical signal levels produced photodiodes 302 and 310. These changes in electrical signal levels are proportional to the amount of light received by photodiodes 302 and 310, and may then be used to determine the location of the light obstruction on panel 276 caused by touch 356.

As can be seen in FIG. 5, photodiodes 292, 294, 296, 298, 399, 302, 304, 306, 308, 310, 312, and 314 that receive light from different LEDs in first plurality of LEDs 254 and 256, second plurality of LEDs 258 and 260, third plurality of LEDs 262 and 264, fourth plurality of LEDs 266 and 268, and fifth plurality of LEDs 270 and 272 when illuminated by circuit 278 are electrically connected in parallel. More specifically, photodiodes 292 and 308 are electrically connected in parallel via line 358 and line 360 to voltage reference 362, photodiodes 294, 310, and 314 are electrically connected in parallel via line 364 and line 360 to voltage reference 362, photodiodes 296, 304, and 312 are electrically connected in parallel via line 366 and line 360 to voltage reference 362, photodiodes 298 and 302 are electrically connected in parallel via line 368 and line 360 to voltage reference 362, and photodiodes 300 and 306 are electrically connected in parallel via line 370 and line 360 to voltage reference 362.

As can also be seen in FIG. 5, photodiodes 292 and 308 are electrically connected to circuit 278 via line 372, photodiodes 294, 310, and 314 are electrically connected to circuit 278 via line 374, photodiodes 296, 304, and 312 are electrically connected to circuit 278 via line 376, photodiodes 298 and 302 are electrically connected to circuit 278 via line 378, and photodiodes 300 and 306 are electrically connected to circuit 278 via line 380 to transmit electrical signals to circuit 278 proportional to the amount of light received by photodiodes 292, 294, 296, 298, 300, 302, 304, 306, 308, 310, 312, and 314 from LEDs 254, 256, 258, 260, 262, 264, 266, 268, 270, and 272. This arrangement results in five connections to circuit 278 via lines 372, 374, 376, 378, 380 for all of photodiodes 292, 294, 296, 298, 300, 302, 304, 306, 308, 310, 312, and 314 rather than twelve separate connections to circuit 278 for all of photodiodes 292, 294, 296, 298, 300, 302, 304, 306, 308, 310, 312, and 314. This also helps save cost by both reducing the number of connections to circuit 278 for photodiodes 292, 294, 296, 298, 300, 302, 304, 306, 308, 310, 312, and 314, as well as reducing the overall size of circuit 278 which saves material cost associated with the manufacture of circuit 278. This electrical configuration of photodiodes 292, 294, 296, 298, 300, 302, 304, 306, 308, 310, 312, and 314, circuit 278, and voltage reference 362 also helps to determine the location of touch 356 on panel 276 of touch screen 252.

As can be seen in FIG. 6, in this example of touch screen 252, photodiodes 292, 294, 296, 298, 300, 302, 304, 306, 308, 310, 312, and 314 are positioned adjacent perimeter 274 of panel 276 opposite LEDs 254, 256, 258, 260, 262, 264, 266, 268, 270, and 272. It is to be understood, however, that in other examples of touch screen 252, photodiodes 292, 294, 296, 298, 300, 302, 304, 306, 308, 310, 312, and 314 do not have to be positioned adjacent perimeter 274 of panel 276 opposite LEDs 254, 256, 258, 260, 262, 264, 266, 268, 270, and 272. As can also be seen in FIG. 6, the number of LEDs 254, 256, 258, 260, 262, 264, 266, 268, 270, and 272 (in this case ten) is less than the number of photodiodes 292, 294, 296, 298, 300, 302, 304, 306, 308, 310, 312, and 314 (in this case twelve). It is to be understood, however, that in other examples of touch screen 252, the number of LEDs may be greater than or equal to the number of photodiodes. It is also to be understood, however, that in other examples of touch screen 252, the total number of LEDs may be greater than or less than ten and the number of photodiodes may be greater than or less than twelve.

As can additionally be seen in FIG. 6, LEDs 254 and 256 from the first plurality of series connected LEDs 254 and 256, LEDs 258 and 260 from the second plurality of series connected LEDs 258 and 260, LED 262 from the third plurality of series connected LEDs 262 and 264, LED 266 from the fourth plurality of series connected LEDs 266 and 268, and LED 270 from the fifth plurality of series connected LEDs 270 and 272 are positioned along a first length 382 of panel 276. Also, LED 264 from the third plurality of series connected LEDs 262 and 264, LED 268 from the fourth plurality of series connected LEDs 266 and 268, and LED 272 from the fifth plurality of series connected LEDs 270 and 272 are positioned along a first width 384 of panel 276. As can further be seen in FIG. 6, photodiodes 292, 294, 296, 298, 300, 302, 304, and 106 form a first set of photodiodes that are positioned along a second length 386 of panel 276 opposite LEDs 254, 258, 262, 266, 270, 256, and 260 and photodiodes 308, 310, 312, and 314 form a second set of photodiodes that are positioned along a second width 388 of panel 276 opposite LEDs 264, 268, and 272. This arrangement of LEDS 254, 256, 258, 260, 262, 264, 266, 268, 270, and 272 and photodiodes 292, 294, 296, 298, 300, 302, 304, 306, 308, 310, 312, and 314 results from the rectangular shape of panel 276 of touch screen 252. It is to be understood, however, that in other examples of touch screen 252, panel 276 may have a different shape (e.g., circular).

Although several drawings have been described and illustrated in detail, it is to be understood that the same are intended by way of illustration and example. These examples are not intended to be exhaustive or to be limited to the precise form disclosed. Modifications and variations may well be apparent.

Additionally, reference to an element in the singular is not intended to mean one, unless explicitly so stated. Furthermore, method elements are not limited to the sequence or order described and illustrated. Moreover, no element or component is intended to be dedicated to the public regardless of whether the element or component is explicitly recited in the following claims.

What is claimed is:

1. A touch screen, comprising:
   a plurality of light emitting diodes positioned adjacent a perimeter of a panel;
   a circuit electrically connected to the plurality of light emitting diodes to individually and sequentially illuminate the light emitting diodes; and
   a plurality of photodiodes positioned adjacent the perimeter of the panel so that each photodiode receives light from at least one of the light emitting diodes when illuminated by the circuit and so that a sub-plurality of the photodiodes each receive light from more than one of the light emitting diodes when illuminated by the circuit,
   wherein the photodiodes are organized over a plurality of sub-circuits, the photodiodes of each sub-circuit are to receive light from different light emitting diodes and are electrically connected in parallel,
   and wherein the photodiodes to receive light from same light emitting diodes are located in different sub-circuits.

2. The touch screen of claim 1, wherein the plurality of photodiodes are positioned adjacent the perimeter of the panel opposite the plurality of light emitting diodes.

3. The touch screen of claim 1, wherein the plurality of photodiodes are electrically connected to the circuit to transmit electrical signals to the circuit proportional to an amount of light received by the photodiodes.

4. The touch screen of claim 1, wherein the plurality of light emitting diodes includes a first set of light emitting diodes positioned along a first length of the panel and a second set of light emitting diodes positioned along a first width of the panel.

5. The touch screen of claim 4, wherein the plurality of photodiodes includes a first set of photodiodes positioned along a second length of the panel opposite the first set of light emitting diodes and a second set of photodiodes positioned along a second width of the panel opposite the second set of light emitting diodes.

6. The touch screen of claim 1, wherein a number of the plurality of light emitting diodes is less than a number of the plurality of photodiodes.

7. A touch screen, comprising:
   a first plurality of light emitting diodes electrically connected in series and positioned adjacent a perimeter of a panel;
   a second plurality of light emitting diodes electrically connected in series and positioned adjacent the perimeter of the panel;
   a circuit electrically connected both to the first plurality of light emitting diodes to illuminate the first plurality of light emitting diodes and to the second plurality of light emitting diodes to illuminate the second plurality of light emitting diodes subsequent to illumination of the first plurality of light emitting diodes; and
   a plurality of photodiodes positioned adjacent the perimeter of the panel so that each photodiode receives light from one of at least one of the first plurality of light emitting diodes when illuminated by the circuit and at least one of the second plurality of light emitting diodes when illuminated by the circuit.

8. The touch screen of claim 7, wherein the plurality of photodiodes are positioned adjacent the perimeter of the panel opposite the first plurality of light emitting diodes and the second plurality of light emitting diodes.

9. The touch screen of claim 7, wherein the plurality of photodiodes are electrically connected to the circuit to transmit electrical signals to the circuit proportional to an amount of light received by the photodiodes.

10. The touch screen of claim 7, wherein individual light emitting diodes of the first plurality of light emitting diodes and individual light emitting diodes of the second plurality of light emitting diodes are positioned along one of a first length of the panel and a first width of the panel.

11. The touch screen of claim 10, wherein the plurality of photodiodes includes a first set of photodiodes positioned along a second length of the panel and a second set of photodiodes positioned along a second width of the panel.

12. A touch screen, comprising:
   a first plurality of light emitting diodes electrically connected in series and positioned adjacent a perimeter of a panel;
   a second plurality of light emitting diodes electrically connected in series and positioned adjacent the perimeter of the panel;
   a circuit electrically connected both to the first plurality of light emitting diodes to illuminate the first plurality of light emitting diodes and to the second plurality of light emitting diodes to illuminate the second plurality of light emitting diodes subsequent to illumination of the first plurality of light emitting diodes; and
   a plurality of photodiodes positioned adjacent the perimeter of the panel so that each photodiode receives light from one of at least one of the first plurality of light emitting diodes when illuminated by the circuit and at least one of the second plurality of light emitting diodes when illuminated by the circuit, wherein photodiodes that receive light from different light emitting diodes in the first plurality of light emitting diodes and the second plurality of light emitting diodes are electrically connected in parallel.

13. The touch screen of claim 12, wherein the plurality of photodiodes are electrically connected to the circuit to transmit electrical signals to the circuit proportional to an amount of light received by the photodiodes.

14. The touch screen of claim 12, wherein individual light emitting diodes of the first plurality of light emitting diodes and individual light emitting diodes of the second plurality of light emitting diodes are positioned along one of a first length of the panel and a first width of the panel.

15. The touch screen of claim 14, wherein the plurality of photodiodes includes a first set of photodiodes positioned along a second length of the panel and a second set of photodiodes positioned along a second width of the panel.

16. The touch screen of claim 7, wherein the first plurality of light emitting diodes are electrically connected in series in a first sub-circuit, the second plurality of light emitting diodes are electrically connected in series in a second sub-circuit, and the first sub-circuit is parallel to the second sub-circuit.

17. The touch screen of claim 12, wherein the first plurality of light emitting diodes are electrically connected in series in a first sub-circuit, the second plurality of light emitting diodes are electrically connected in series in a second sub-circuit, and the first sub-circuit is parallel to the second sub-circuit.

* * * * *

UNITED STATES PATENT AND TRADEMARK OFFICE
CERTIFICATE OF CORRECTION

PATENT NO. : 10,268,316 B2
APPLICATION NO. : 15/523348
DATED : April 23, 2019
INVENTOR(S) : John Barker Page 1 of 1

It is certified that error appears in the above-identified patent and that said Letters Patent is hereby corrected as shown below:

On the Title Page

In Column 2, item (74), Attorney, Agent or Firm, Lines 1-2, delete "H Inc. Patent Department" and insert -- HP Inc. Patent Department --, therefor.

Signed and Sealed this
Seventeenth Day of December, 2019

Andrei Iancu
*Director of the United States Patent and Trademark Office*